(12) United States Patent
McGinnis et al.

(10) Patent No.: US 9,546,107 B2
(45) Date of Patent: Jan. 17, 2017

(54) GLASS COMPOSITION FOR THE MANUFACTURE OF FIBERS AND PROCESS

(71) Applicant: OCV Intellectual Capital, LLC, Toledo, OH (US)

(72) Inventors: Peter B. McGinnis, Gahanna, OH (US); Douglas Alan Hofmann, Hebron, OH (US); Michelle Lynn Korwin-Edson, Granville, OH (US)

(73) Assignee: OCV Intellectual Capital, LLC, Toledo, OH (US)

( * ) Notice: Subject to any disclaimer, the term of this patent is extended or adjusted under 35 U.S.C. 154(b) by 0 days.

(21) Appl. No.: 14/435,788

(22) PCT Filed: Oct. 18, 2013

(86) PCT No.: PCT/US2013/065554
§ 371 (c)(1),
(2) Date: Apr. 15, 2015

(87) PCT Pub. No.: WO2014/062987
PCT Pub. Date: Apr. 24, 2014

(65) Prior Publication Data
US 2015/0259243 A1 Sep. 17, 2015

Related U.S. Application Data

(60) Provisional application No. 61/715,494, filed on Oct. 18, 2012.

(51) Int. Cl.
| | | |
|---|---|---|
| C03C 13/00 | (2006.01) | |
| C03C 3/085 | (2006.01) | |
| C03C 3/087 | (2006.01) | |
| C03C 3/091 | (2006.01) | |
| C03C 13/06 | (2006.01) | |
| C03B 37/01 | (2006.01) | |

(52) U.S. Cl.
CPC .............. *C03C 13/00* (2013.01); *C03B 37/01* (2013.01); *C03C 3/085* (2013.01); *C03C 3/087* (2013.01); *C03C 3/091* (2013.01); *C03C 13/06* (2013.01); *C03C 2213/00* (2013.01); *C03C 2213/02* (2013.01)

(58) Field of Classification Search
CPC .......... C03C 3/083; C03C 3/085; C03C 3/087; C03C 13/00; C03C 13/06
See application file for complete search history.

(56) References Cited

U.S. PATENT DOCUMENTS

| | | | |
|---|---|---|---|
| 3,904,424 A | * | 9/1975 | Aoki ..................... C03C 13/002 501/38 |
| 5,312,806 A | | 5/1994 | Mogensen |
| 5,932,500 A | | 8/1999 | Jensen et al. |
| 6,156,683 A | | 12/2000 | Grove-Rasmussen et al. |

| | | | |
|---|---|---|---|
| 2005/0085369 A1 | | 4/2005 | Jensen |
| 2008/0182317 A1 | | 7/2008 | Maquin et al. |
| 2011/0172077 A1 | | 7/2011 | Lewis |
| 2014/0128530 A1 | | 5/2014 | Yang |

FOREIGN PATENT DOCUMENTS

| | | |
|---|---|---|
| CH | 218012 | 11/1941 |
| DE | 1026928 | 3/1958 |
| DE | 29515168 | 4/1996 |
| EP | 1157974 | 11/2001 |
| EP | 2354104 | 8/2011 |
| FR | 2778399 | 11/1999 |
| GB | 1209244 | 10/1970 |
| JP | 50006823 A * | 1/1975 |
| JP | 50098914 A * | 8/1975 |
| SU | 366165 A * | 3/1973 |
| WO | 96/14274 | 5/1996 |
| WO | 97/22563 | 6/1997 |
| WO | 98/23547 | 6/1998 |
| WO | 11/113303 | 9/2011 |

OTHER PUBLICATIONS

International Search Report and Written Opinion from PCT/US13/065554 dated Nov. 5, 2014.
Sebdani, Maryam M. et al., "Effect of divalent cations and DiO2 on the crystallization behavior of calcium aluminate glasses", Journal of Non-Crystalline Solids, 413, pp. 20-23, 2015.
Lee, In-Ho et al., "Effects of magnesium content on the physical, chemical and degradation properties in a MgO—Ca2—Na2O—P2O5 glass system", Journal of Non-Crystalline Solids, 363, pp. 57-63, 2013.
Prokhorenko, Oleg A., "Finding Optimal Glass Compositions", 73rd Conference on Glass Problems, The Americal Ceramic Society, John Wiley & Sons, Inc., pp. 27-41, 2013.
The Properties of Glass, Second Edition, by George W. Morey, Reinhold Publishing Corporation, 1954, cover page and pp. 396-405.
Priven, A.I., "Calculation of the Viscosity of Glass-forming Melts: II. The MgO—CaO—SrO—BaO—Al2O3—SiO2 System", Glass Physics and Chemistry, vol. 23, No. 6, pp. 416-428, 1997.
Introduction to Glass Science and Technology, James E. Shelby, cover page and back page, pp. 196-197, 1997.
Fundamentals of Inorganic Glasses, Arun K. Varshneya, Academic Press, Inc., Harcourt Brace & Company, Publishers, title page, pp. 156-159, 1994.
Fiberglass and Glass Technology, Energy-Friendly Compositions and Applications, Frederick T. Wallenberger, Paul A. Bingham, Editors, front and back cover, pp. 14, 2010.

* cited by examiner

*Primary Examiner* — Elizabeth A Bolden
(74) *Attorney, Agent, or Firm* — Calfee, Halter & Griswold LLP

(57) ABSTRACT

Improved glass batch compositions and processes of fiberizing the compositions to form fibers are provided. The batch of the present composition can include: 40-60 wt % $SiO_2$; 15-50 wt % $Al_2O_3$; 0-30 wt % MgO; 0-25 wt % CaO; 0-5 wt % $Li_2O$; 0-9 wt % $B_2O_3$; and 0-5 wt % $Na_2O$. The fibers formed of the compositions may have a Young's modulus of greater than 82.7 GPa (12 MPSI). The fibers may also have good biosolubility ($k_{dis}$), of at least 100 ng/cm²/hour.

19 Claims, No Drawings

GLASS COMPOSITION FOR THE MANUFACTURE OF FIBERS AND PROCESS

CROSS REFERENCE TO RELATED APPLICATIONS

The present application is the U.S. national phase entry of PCT/US2013/065554, filed on Oct. 18, 2013, which claims priority to U.S. provisional application No. 61/715,494, filed on Oct. 18, 2012, titled GLASS COMPOSITION FOR THE MANUFACTURING OF FIBERS AND PROCESS, both of which are incorporated by reference in its their entirety.

BACKGROUND

Glass fibers for use in composite applications are manufactured from various raw materials combined in specific proportions to yield a desired chemical composition. This proportion is commonly termed a "glass batch." The composition of the glass batch and the glass manufactured from it are typically expressed in terms of percentages of the components, which are expressed as oxides. $SiO_2$, $Al_2O_3$, CaO, MgO, $B_2O_3$, $Na_2O$, $K_2O$, $Fe_2O_3$, and minor amounts of other oxides are common components of a glass batch. Numerous types of glasses may be produced from varying the amounts of these oxides, or eliminating some of the oxides, in the glass batch. Examples of such glasses that may be produced include E-glass, S-glass, R-glass, A-glass, C-glass, and ECR-glass. The glass composition determines the properties of the glass including properties such as the viscosity, the liquidus temperature, the durability, the density, the strength, and the Young's modulus of the glass. Non-physical considerations given to commercial glass compositions include the raw material cost and environmental impact caused by manufacturing the glass.

E-glass compositions are the most common glass compositions for making continuous glass fiber strands used in textile and reinforcement applications. One advantage of E-glass is that its liquidus temperature is approximately 200° F. below its forming temperature, which is commonly defined as the temperature at which the viscosity of the glass equals 1000 poise. E-glass has a wide range of forming temperatures and a low devitrification rate. Historically, commercial E-glass compositions possessed forming temperatures between 2150° F. and 2350° F. and liquidus values from approximately 100° F. to 250° F. below the forming temperature.

The most common high strength glass compositions for making continuous glass fiber strands are "S-Glasses." S-Glass is a family of glasses composed primarily of the oxides of magnesium, aluminum, and silicon with a chemical composition that produces glass fibers having a higher mechanical strength than E-Glass fibers. S-glasses generally have compositions that were originally designed to be used in high-strength applications such as ballistic armor. Some examples of S-Glasses include XStrand® S, FliteStrand® S, and ShieldStrand® S by Owens Corning, having a Young's modulus of about 88 GPa. Another example is S-2 Glass® by AGY, which is an S-Glass that may have a Young's modulus of approximately 89.6 GPa (13 MPSI).

Many glasses having high mechanical strengths can be very costly to produce, because of their high forming temperatures and due to other process constraints. In addition, many glasses having high mechanical strength may not be soluble in biological fluids. The lack of solubility in biological fluids can limit the product forms that are acceptable to the customer. Thus, there remains a need in the art for improved glass compositions and methods of making such glasses that provide high mechanical strength having the advantage of being soluble in biological fluids.

SUMMARY

In some embodiments of the present invention, high modulus glass compositions that may be formed into fibers for use in composite materials are provided. In some embodiments, the composition of the present invention is based on the Eutectic composition: 48 wt % $SiO_2$, 35 wt % $Al_2O_3$, and 17 wt % MgO. In other embodiments, the present composition includes: about 40-60 wt % $SiO_2$; 15-50 wt % $Al_2O_3$; 0-30 wt % MgO; 0-25 wt % CaO; 0-5 wt % $Li_2O$; 0-9 wt % $B_2O_3$; and 0-5 wt % $Na_2O$. In some exemplary embodiments, the fibers formed of the compositions have a Young's modulus greater than about 82.7 GPa (12 MPSI), or about 89.6 GPa (13 MPSI), or about 96.5 GPa (14 MPSI). In other exemplary embodiments, the fibers formed of the compositions have a Young's modulus greater than 103.4 GPa (15 MPSI).

In yet some exemplary embodiments, the fibers formed of the compositions also are biosoluble. Biosolubility is a measure of the speed at which a material dissolves in biological fluid. For example, the fibers may have a fiber biosolubility that is greater than about 100 $ng/cm^2/hour$. In other examples, it is possible to control the chemistry of the compositions to provide a fiber biosolubility of greater than about 200 $ng/cm^2/hour$ or even greater than about 300 $ng/cm^2/hour$.

In yet other embodiments of the present invention, methods of forming fibers having a high modulus are provided. The methods may include, for example, using a traditional mineral wool process to form fibers from the compositions of the present invention. The methods may also include using a traditional glass fiber forming process.

DETAILED DESCRIPTION

The present invention will now be described with occasional reference to the specific embodiments of the invention. This invention may, however, be embodied in different forms and should not be construed as limited to the embodiments set forth herein. Rather, these embodiments are provided so that this disclosure will be thorough and complete, and will fully convey the scope of the invention to those skilled in the art.

Unless otherwise defined, all technical and scientific terms used herein have the same meaning as commonly understood by one of ordinary skill in the art to which this invention belongs. The terminology used in the description of the invention herein is for describing particular embodiments only and is not intended to be limiting of the invention. As used in the description of the invention and the appended claims, the singular forms "a," "an," and "the" are intended to include the plural forms as well, unless the context clearly indicates otherwise.

Unless otherwise indicated, all numbers expressing quantities of ingredients, properties such as molecular weight, reaction conditions, and so forth as used in the specification and claims are to be understood as being modified in all instances by the term "about." Accordingly, unless otherwise indicated, the numerical properties set forth in the specification and claims are approximations that may vary depending on the desired properties sought to be obtained in embodiments of the present invention. Notwithstanding that the numerical ranges and parameters setting forth the broad scope of the invention are approximations, the numerical values set forth in the specific examples are reported as precisely as possible. Any numerical values, however, inherently contain certain errors necessarily resulting from error found in their respective measurements.

In accordance with exemplary embodiments of the present invention, glass batch compositions useful for forming fibers are provided. Additionally, fibers formed from the glass batch compositions are also provided. Fibers formed using the compositions of the present invention may have a modulus substantially higher than the modulus of S-Glass fibers, such as XStrand®S, FliteStrand®S, and ShieldStrand®S, and S-2 Glass®. The fibers formed using the compositions of the present invention may also have high strengths.

Additionally, the glass batch compositions of the present invention may be used to produce fibers having a high modulus without the use of traditional melters that may employ platinum/rhodium alloy, as will be discussed further herein. In other embodiments, the glass batch compositions of the present invention may be formed in traditional melters, as will be discussed further herein.

In accordance with exemplary embodiments of the present invention, the compositions of the present invention may be based on the Eutectic composition: 48 wt % $SiO_2$, 35 wt % $Al_2O_3$, and 17 wt % MgO. For instance, in some exemplary embodiments, the glass batch composition of the present invention includes about 40-60 wt % $SiO_2$; 15-50 wt % $Al_2O_3$; 0-30 wt % MgO; 0-25 wt % CaO; 0-5 wt % $Li_2O$; 0-9 wt % $B_2O_3$, and 0-5 wt % $Na_2O$. In other exemplary embodiments, the glass composition includes about 45-55 wt % $SiO_2$; 20-45 wt % $Al_2O_3$; 5-25 wt % MgO; 3-25 wt % CaO; 0-5 wt % $Li_2O$; 0-5 wt % $B_2O_3$; and 0-5 wt % $Na_2O$. In further exemplary embodiments, the glass composition includes about 45-55 wt % $SiO_2$; 20-35 wt % $Al_2O_3$; 10-20 wt % MgO; 5-25 wt % CaO; 0-5 wt % $Li_2O$; 0-5 wt % $B_2O_3$; and 0-5 wt % $Na_2O$.

Other constituents may be added to improve the properties of the resulting fiber and/or to improve the processing or biosolubility of the glass. For example, the compositions may include about 5.0 or less weight % of additional compounds, such as oxides, for example. Exemplary oxides that may be included in the composition include $K_2O$, $P_2O_5$, ZnO, $ZrO_2$, SrO, BaO, $SO_3$, $F_2$, $Ce_2O_3$, BeO, $SeO_2$, $Y_2O_3$, $La_2O_3$, $TiO_2$ and $Fe_2O_3$, and combinations thereof as intentional additives or impurities, each being present in up to 5.0 weight %.

Additionally, components may be added to the batch composition, for example, to facilitate processing, that are later eliminated, thereby forming a glass composition that is essentially free of such components. Thus, for instance, minute quantities of components, such as "tramp" oxides, may be present as trace impurities in the raw materials providing the silica, calcia, alumina, and magnesia components in commercial practice of the invention or they may be processing aids that are essentially removed during manufacture. In some exemplary embodiments, such tramp oxides are present in less than about 5.0 weight %, or less than about 1.0 weight %.

In some embodiments, the fibers formed from the compositions described herein have a Young's modulus greater than about 82.7 GPa (12 MPSI). In other embodiments, the fibers from the compositions described herein may have a Young's modulus greater than about 89.6 GPa (13 MPSI). In yet other examples, the fibers formed from the compositions may have a Young's modulus greater than about 96.5 GPa (14 MPSI), and even greater than 103.4 GPa (15.0 MPSI).

In certain exemplary embodiments, the glass fibers formed of the batch compositions may be biosoluble, as measured by a biosolubility index ($k_{dis}$). The biosolubility may be estimated using a published model for high alumina fibers. This model is published as an on-line calculator at http://fiberscience.owenscorning.com/kdisapp.html. For example, the fibers may have a fiber biosolubility that is greater than about 100 ng/cm²/hour. In some exemplary embodiments, the fibers have a fiber biosolubility of greater than about 200 ng/cm²/hour or even greater than about 300 ng/cm²/hour. In further exemplary embodiments, the fibers have a fiber biosolubility of greater than about 1000 ng/cm²/hour, greater than about 2000 ng/cm²/hour, or even greater than about 10,000 ng/cm²/hour. The biosolubility of the compositions allows the glass to be safely fiberized using the rotating wheels of the mineral wool process, or using other processes that are not traditionally used to form high modulus fibers. Additionally, the biosolubility of the fibers allow the production of fibers having small diameters using traditional reinforcement fiber forming processes.

In some exemplary embodiments, glass fibers formed from of the inventive batch composition disclosed herein have a density ranging from about 2.4 g/cc to about 3.0 g/cc. In other exemplary embodiments, the glass fibers formed of the inventive batch composition have a density from about 2.57 g/cc to about 2.97 g/cc.

Generally, continuous glass fibers are formed by passing molten glass material through a bushing. As the glass exits the bushing through very fine orifices, the glass is cooled, such as by water jets, and mechanically drawn onto a high speed winder. As the fibers are wound, tension causes the streams of molten glass to be pulled into thin fibrous elements called filaments. However, in some exemplary embodiments, the inventive glass fibers are discontinuous and may be formed using any known fiber forming process, such as, for example, a mineral wool process, a steam jet process, rotary process, flame attenuation, and the like.

In some exemplary embodiments, the mineral wool process includes any suitable melting furnace such as a cupola or a tank furnace (not illustrated) into which the batch components may be introduced and melted to form a molten material. Molten glass from the furnace flows into a cylindrical container that includes small holes. As the cylindrical container spins, horizontal streams of glass begin to flow out of the holes. The molten glass streams may be attenuated by a downward blast of air, hot gas, or both. In some exemplary embodiments, the fibers fall against one or more fiberizing rolls. A first fiberizing roll works to break up the molten material, forming fibers that may then be propelled to an optional second fiberizing roll. In some exemplary embodiments, the second fiberizing roll spins in a direction counter to that of the first roll and further breaks up the material to form finished fibers. In some exemplary embodiments, a jet of high pressure air may be again used between the first and second rolls to further attenuate the fibers.

In some exemplary embodiments, the fibers may have a sizing composition applied as they leave the rolls or may be collected and have a sizing composition applied in a post manufacturing process. It will be understood that any suitable sizing composition may be used to size the fibers, and the sizing composition may be selected to be compatible with the particular resin system of a composite article made using the fibers. It will be understood by those having skill in the art, that any suitable discontinuous fiber forming process may be used to form the fibers. When a discontinuous process is employed to form fibers, the fibers produced from the discontinuous process may have dimensions that allow the fibers to be respirable. Particularly, during air attenuation, the discontinuous fibers may run the risk of being released into the air, becoming respirable fibers. It is an advantage of the present invention that any respirable fibers produced from the discontinuous processes exhibit a biosolubility with $k_{dis}$ greater than 100 ng/cm²/hour, such that the fibers are soluble in biological fluids.

It will be understood that other fiberizing processes may be useful to form fibers from the glass batch compositions. For example, some embodiments of the glass composition may be formed using a traditional glass forming processes employed to produce continuous fibers. For example, a traditional direct melt process may be used, and the fibers may be formed through any suitable bushing, such as a platinum or platinum/rhodium bushings, and wound on a winder. In other embodiments, the fibers may be formed using traditional batch processes. For example, the fibers may be formed using a platinum lined melter and produced with the use of any suitable bushings. When the fibers are formed using a bushing, the fiber diameters may be controlled to produce continuous fibers having a desired diameter. It is an advantage of the present invention that continuous fibers having very small diameters, while exhibiting biosolubility, strength, and modulus, may be formed.

The fibers of the present invention may be used as reinforcements in composite articles formed using any suitable resin, to form fabrics useful in forming composite articles, or for any other purpose.

Examples

The present invention will be better understood by reference to the following examples which are offered by way of illustration not limitation. Fibers having the compositions listed in Tables I-A-I-I include the constituents listed by weight percent. (Please note that * indicates a predicted value).

TABLE I-A

|  | Ex. 1 | Ex. 2 | Ex. 3 | Ex. 4 | Ex. 5 | Ex. 6 | Ex. 7 |
|---|---|---|---|---|---|---|---|
| SiO₂ | 48 | 51 | 45 | 45 | 45 | 51 | 49 |
| Al₂O₃ | 35 | 31 | 32 | 37 | 31 | 31 | 31 |
| MgO | 17 | 15 | 15 | 18 | 19 | 15 | 15 |
| CaO | 0 | 3 | 5 | 0 | 5 | 0 | 5 |
| Na₂O | 0 | 0 | 0 | 0 | 0 | 0 | 0 |
| Li₂O | 0 | 0 | 3 | 0 | 0 | 3 | 0 |
| B₂O₃ | 0 | 0 | 0 | 0 | 0 | 0 | 0 |
| Viscosity (log 2.0 estimate) ° F. | 2681 | 2591 | 2473 | 2712 | 2646 | 2530 | 2585 |
| Viscosity (log 3.0 estimate) ° F. | 2507 | 2290 | 2216 | 2561 | 2510 | 2232 | 2379 |
| Liquidus (° F.) | 2668 | 2600 | 2728 | 2788 | 2720 | 2659 | 2682 |
| Density (g/cc) | 2.660 | 2.651 | 2.664 | 2.692 | 2.722 | 2.598 | 2.673 |
| Elastic Modulus (GPa) | 101.4 | 98.3 | 100.2* | 104.9 | 101.5* | 98.0 | 98.7 |
| $k_{dis}$ (ng/cm²/hr) | 1690 | 241 | 12730* | 2038 | 4641* | 936 | 621* |

TABLE I-B

|  | Ex. 8 | Ex. 9 | Ex. 10 | Ex. 11 | Ex. 12 | Ex. 13 | Ex. 14 |
|---|---|---|---|---|---|---|---|
| SiO₂ | 48 | 45 | 45 | 45 | 45 | 46 | 51 |
| Al₂O₃ | 37 | 31 | 31 | 31 | 34 | 31 | 31 |
| MgO | 15 | 21 | 16 | 21 | 21 | 15 | 18 |
| CaO | 0 | 3 | 5 | 0 | 0 | 5 | 0 |
| Na₂O | 0 | 0 | 0 | 0 | 0 | 0 | 0 |
| Li₂O | 0 | 0 | 3 | 3 | 0 | 3 | 0 |
| B₂O₃ | 0 | 0 | 0 | 0 | 0 | 0 | 0 |
| Viscosity (log 2.0 estimate) ° F. | 2635 | 2470 | 2278 | 2503 | 2619 | 2439 | 2578 |
| Viscosity (log 3.0 estimate) ° F. | 2368 | 2198 | 1919 | 2258 | 2443 | 2165 | 2274 |
| Liquidus (° F.) | 2784 | 2736 | 2723 | 2769 | 2772 | 2682 | 2652 |
| Density (g/cc) | 2.657 | 2.725 | 2.672 | 2.672 | 2.710 | 2.660 | 2.654 |
| Elastic Modulus (GPa) | 101.6* | 101.8 | 99.8 | 103.3* | 104.4* | 99.9 | 100.2 |
| $k_{dis}$ (ng/cm²/hr) | 527* | 7,447 | 10,802 | 17489* | 3634* | 10,998 | 219 |

TABLE I-C

|  | Ex. 15 | Ex. 16 | Ex. 17 | Ex. 18 | Ex. 19 | Ex. 20 | Ex. 21 |
|---|---|---|---|---|---|---|---|
| SiO₂ | 45 | 45 | 48 | 51 | 45 | 46.6 | 45.1 |
| Al₂O₃ | 37 | 35 | 31 | 34 | 37 | 34.0 | 32.9 |

TABLE I-C-continued

|  | Ex. 15 | Ex. 16 | Ex. 17 | Ex. 18 | Ex. 19 | Ex. 20 | Ex. 21 |
|---|---|---|---|---|---|---|---|
| MgO | 15 | 15 | 21 | 15 | 15 | 16.5 | 16.0 |
| CaO | 0 | 5 | 0 | 0 | 3 | 0 | 0 |
| $Na_2O$ | 0 | 0 | 0 | 0 | 0 | 0 | 0 |
| $Li_2O$ | 3 | 0 | 0 | 0 | 0 | 0 | 0 |
| $B_2O_3$ | 0 | 0 | 0 | 0 | 0 | 3 | 6 |
| Viscosity (log 2.0 estimate) °F. | 2718 | 2520 | 2480 | 2642 | 2520 | — | — |
| Viscosity (log 3.0 estimate) °F. | 2554 | 2212 | 2166 | 2334 | 2205 | — | — |
| Liquidus (°F.) | 2801 | 2690 | 2638 | 2734 | 2755 | — | — |
| Density (g/cc) | 2.637 | 2.703 | 2.695 | 2.637 | 2.695 | 2.635 | 2.606 |
| Elastic Modulus (GPa) | 102.9 | 101.1 | 102.2 | 99.3* | 102.3* | 98.9 | 95.4 |
| $k_{dis}$ (ng/cm²/hr) | 7526* | 2518 | 2025 | 186 | 2144 | 950 | 1025 |

TABLE I-D

|  | Ex. 22 | Ex. 23 | Ex. 24 | Ex. 25 | Ex. 26 | Ex. 27 | Ex. 28 |
|---|---|---|---|---|---|---|---|
| $SiO_2$ | 43.7 | 53 | 40 | 40 | 40 | 40 | 49 |
| $Al_2O_3$ | 31.9 | 28 | 46 | 28 | 28 | 35 | 28 |
| MgO | 15.5 | 19 | 11 | 23 | 17 | 7 | 23 |
| CaO | 9.0 | 0 | 0 | 9 | 15 | 15 | 0 |
| Na2O | 0 | 0 | 3 | 0 | 0 | 3 | 0 |
| $Li_2O$ | 0 | 0 | 0 | 0 | 0 | 0 | 0 |
| B2O3 | 9 | 0 | 0 | 0 | 0 | 0 | 0 |
| Viscosity (log 2.0 estimate) °F. | — | 2627 | 2641* | 2415 | 2606 | 2376 | 2536 |
| Viscosity (log 3.0 estimate) °F. | — | 2318 | 2476* | 2226* | 2409 | 2248 | 2370 |
| Liquidus (°F.) | — | 2633 | >2820 | >2772 | 2743 | 2694 | 2547 |
| Density (g/cc) | 2.578 | 2.641 | 2.667 | 2.799 | 2.796 | 2.704 | 2.699 |
| Elastic Modulus (GPa) | 92.0 | 98.3 | 104.3* | 103.6* | 99.9* | 90.9 | 101 |
| $k_{dis}$ (ng/cm²/hr) | 1680 | 83.6 | 9307* | 75847* | 61329* | 11320 | 1449 |

TABLE I-E

|  | Ex. 29 | Ex. 30 | Ex. 31 | Ex. 32 | Ex. 33 | Ex. 34 | Ex. 35 |
|---|---|---|---|---|---|---|---|
| $SiO_2$ | 40 | 44 | 53 | 53 | 40 | 53 | 40 |
| $Al_2O_3$ | 38 | 46 | 40 | 28 | 28 | 28 | 46 |
| MgO | 7 | 7 | 7 | 16 | 23 | 7 | 7 |
| CaO | 15 | 0 | 0 | 0 | 6 | 12 | 4 |
| $Na_2O$ | 0 | 3 | 0 | 3 | 3 | 0 | 3 |
| $Li_2O$ | 0 | 0 | 0 | 0 | 0 | 0 | 0 |
| B2O3 | 0 | 0 | 0 | 0 | 0 | 0 | 0 |
| Viscosity (log 2.0 estimate) °F. | 2559* | 2717* | 2789* | 2657 | 2428* | 2746 | 2652* |
| Viscosity (log 3.0 estimate) °F. | 2355* | 2510* | 2507* | 2430 | 2230* | 2413 | 2472* |
| Liquidus (°F.) | 2707 | >2842 | >2833 | 2449 | >2830 | 2548 | >2816 |
| Density (g/cc) | 2.731 | 2.630 | 2.579 | 2.596 | 2.751 | 2.634 | 2.666 |
| Elastic Modulus (GPa) | 99.1* | 100.8* | 97.1* | 93.3 | 102.0* | 90.5 | 101.8* |
| $k_{dis}$ (ng/cm²/hr) | 15041* | 1246* | 28* | 55.9 | 94454* | 71 | 8077* |

TABLE I-F

|  | Ex. 36 | Ex. 37 | Ex. 38 | Ex. 39 | Ex. 40 | Ex. 41 | Ex. 42 |
|---|---|---|---|---|---|---|---|
| $SiO_2$ | 50 | 47 | 40 | 40 | 40 | 40 | 40 |
| $Al_2O_3$ | 28 | 28 | 46 | 28 | 34 | 46 | 37 |
| MgO | 7 | 7 | 14 | 14 | 23 | 7 | 23 |
| CaO | 15 | 15 | 0 | 15 | 0 | 7 | 0 |

TABLE I-F-continued

|  | Ex. 36 | Ex. 37 | Ex. 38 | Ex. 39 | Ex. 40 | Ex. 41 | Ex. 42 |
|---|---|---|---|---|---|---|---|
| $Na_2O$ | 0 | 3 | 0 | 3 | 3 | 0 | 0 |
| $Li_2O$ | 0 | 0 | 0 | 0 | 0 | 0 | 0 |
| $B2O3$ | 0 | 0 | 0 | 0 | 0 | 0 | 0 |
| Viscosity (log 2.0 estimate) ° F. | 2657 | 2709 | 2620* | 2416 | 2488* | 2639* | 2505* |
| Viscosity (log 3.0 estimate) ° F. | 2342 | 2364 | 2474* | 2236 | 2316* | 2468* | 2354* |
| Liquidus (° F.) | 2606 | 2487 | >2820 | 2714 | >2832 | >2843 | >2836 |
| Density (g/cc) | 2.675 | 2.676 | 2.723 | 2.754 | 2.713 | 2.702 | 2.748 |
| Elastic Modulus (GPa) | 91.0 | 89.6 | 107.8* | 96.4* | 105.2* | 103.4* | 108.5* |
| $k_{dis}$ (ng/cm²/hr) | 380 | 5692 | 8311* | 68677* | 50264* | 6486* | 29444* |

TABLE I-G

|  | Ex. 43 | Ex. 44 | Ex. 45 | Ex. 46 | Ex. 47 | Ex. 48 | Ex. 49 |
|---|---|---|---|---|---|---|---|
| $SiO_2$ | 46 | 40 | 40 | 40 | 50 | 40 | 40 |
| $Al_2O_3$ | 28 | 50 | 30 | 25 | 25 | 25 | 50 |
| MgO | 23 | 0 | 0 | 10 | 25 | 5 | 5 |
| CaO | 0 | 5 | 25 | 25 | 0 | 25 | 0 |
| $Na_2O$ | 3 | 5 | 5 | 0 | 0 | 5 | 5 |
| $Li_2O$ | 0 | 0 | 0 | 0 | 0 | 0 | 0 |
| $B_2O_3$ | 0 | 0 | 0 | 0 | 0 | 0 | 0 |
| Viscosity (log 2.0 estimate) ° F. | 2615 | 2720* | 2563 | 2352 | 2491 | 2399 | 2706* |
| Viscosity (log 3.0 estimate) ° F. | 2412 | 2526* | 2226 | 2107 | 2209 | 2089 | 2530* |
| Liquidus (° F.) | 2655 | >2831 | 2372 | 2436 | 2517 | 2304 | >2822 |
| Density (g/cc) | 2.687 | 2.649 | 2.719 | 2.817 | 2.699 | 2.759 | 2.754 |
| Elastic Modulus (GPa) | 100.5* | 98.5* | 87.1 | 93.6 | 101.0 | 89.0 | 101.6* |
| $k_{dis}$ (ng/cm²/hr) | 5720* | 4792* | 36980 | 36109 | 2580 | 32428 | 5720* |

TABLE I-H

|  | Ex. 50 | Ex. 51 | Ex. 52 | Ex. 53 | Ex. 54 | Ex. 55 | Ex. 56 |
|---|---|---|---|---|---|---|---|
| $SiO_2$ | 40 | 50 | 45 | 45 | 40 | 40 | 40 |
| $Al_2O_3$ | 50 | 25 | 25 | 25 | 30 | 25 | 35 |
| MgO | 0 | 0 | 0 | 25 | 25 | 25 | 0 |
| CaO | 10 | 25 | 25 | 0 | 0 | 5 | 25 |
| $Na_2O$ | 0 | 0 | 5 | 5 | 5 | 5 | 0 |
| $Li_2O$ | 0 | 0 | 0 | 0 | 0 | 0 | 0 |
| $B_2O_3$ | 0 | 0 | 0 | 0 | 0 | 0 | 0 |
| Viscosity (log 2.0 estimate) ° F. | 2698* | 2650 | 2538 | 2499 | 2451* | 2401* | 2548* |
| Viscosity (log 3.0 estimate) ° F. | 2519* | 2332 | 2221 | 2200 | 2263* | 2192* | 2306* |
| Liquidus (° F.) | >2819 | 2657 | 2343 | 2733 | >2813 | >2828 | 2755 |
| Density (g/cc) | 2.965 | 2.699 | 2.709 | 2.687 | 2.709 | 2.743 | 2.738 |
| Elastic Modulus (GPa) | 101.2* | 84.9 | 84.5 | 99.3* | 103.2* | 100.5* | 93.1* |
| $k_{dis}$ (ng/cm²/hr) | 3324* | 478 | 28518 | 15547* | 95099* | 160870* | 16092* |

TABLE I-I

|  | Ex. 57 | Ex. 58 | Ex. 59 | Ex. 60 | Ex. 61 | Ex. 62 | Ex. 63 |
|---|---|---|---|---|---|---|---|
| $SiO_2$ | 40 | 55 | 40 | 52 | 56 | 46 | 42 |
| $Al_2O_3$ | 35 | 25 | 25 | 22 | 20 | 37 | 42 |
| MgO | 25 | 20 | 25 | 26 | 24 | 17 | 16 |
| CaO | 0 | 0 | 10 | 0 | 0 | 0 | 0 |
| $Na_2O$ | 0 | 0 | 0 | 0 | 0 | 0 | 0 |
| $Li_2O$ | 0 | 0 | 0 | 0 | 0 | 0 | 0 |

TABLE I-I-continued

|  | Ex. 57 | Ex. 58 | Ex. 59 | Ex. 60 | Ex. 61 | Ex. 62 | Ex. 63 |
|---|---|---|---|---|---|---|---|
| $B_2O_3$ | 0 | 0 | 0 | 0 | 0 | 0 | 0 |
| Viscosity (log 2.0 estimate) ° F. | 2479* | 2630 | 2379* | — | — | — | — |
| Viscosity (log 3.0 estimate) ° F. | 2328* | 2324 | 2185* | 1342.93 | — | 1390.66 | 1364.82 |
| Liquidus (° F.) | >2835 | 2549 | 2822 | 1353.89 | — | 1498.89 | 1567.22 |
| Density (g/cc) | 2.788 | 2.631 | 2.817 | 2.70 | — | 2.68 | 2.71 |
| Elastic Modulus (GPa) | 108.6* | 97.0 | 103.2* | — | — | — | — |
| Log k-dis (ng/cm²/hr) | 39001* | 41 | 111603* | — | — | — | — |

The fibers of the above Examples were formed using a one hole bushing in a lab scale melter. The Young's modulus was measured using the well established sonic technique whereby the speed of sound is measured in an individual fiber. Pristine fiber strengths were measured by pulling pristine fibers from a one-hole bushing and measuring the breaking stress over a 2-inch gauge length. The biosolubility was estimated using a published model for high alumina fibers. This model is published as an on-line calculator at http://fiberscience.owenscorning.com/kdisapp.html.

It should be understood that where small quantities of components are specified in the compositions, for example, quantities on the order of about 2.0 weight percent or less, those components may be present in the form of trace impurities present in the raw materials, rather than intentionally added.

The present invention should not be considered limited to the specific examples described herein, but rather should be understood to cover all aspects of the invention. Various modifications, equivalent processes, as well as numerous structures and devices to which the present invention may be applicable will be readily apparent to those of skill in the art. Those skilled in the art will understand that various changes may be made without departing from the scope of the invention, which is not to be considered limited to what is described in the specification.

What is claimed is:

1. Glass fibers formed from a composition comprising:
   40.0-54.0 wt. % $SiO_2$;
   31.0-50.0 wt. % $Al_2O_3$;
   15.0-30.0 wt. % MgO;
   0-14.0 wt. % CaO;
   0-5.0 wt. % $Na_2O$;
   0-1.0 wt. % $Fe_2O_3$;
   0-1.0 wt. % $TiO_2$;
   0-5.0 wt. % $Li_2O$; and
   0-9.0 wt. % $B_2O_3$,
   wherein the glass fibers are biosoluble with a $k_{dis}$ greater than 100.0 ng/cm²/hour.

2. The glass fibers of claim 1, wherein the glass fibers have a $k_{dis}$ greater than 300.0 ng/cm²/hour.

3. The glass fibers of claim 2, wherein the glass fibers have a $k_{dis}$ greater than 1,000 ng/cm²/hour.

4. The glass fibers of claim 1, wherein the composition comprises:
   45.0-51.0 wt. % $SiO_2$;
   31.0-45.0 wt. % $Al_2O_3$;
   15.0-25.0 wt. % MgO;
   3-9.0 wt. % CaO;
   0-5.0 wt. % $Na_2O$;
   0-1.0 wt. % $Fe_2O_3$;
   0-1.0 wt. % $TiO_2$;
   0-5.0 wt. % $Li_2O$; and
   0-5.0 wt. % $B_2O_3$.

5. The glass fibers of claim 1, wherein the composition comprises:
   45.0-49.0 wt. % $SiO_2$;
   31.0-25.0 wt. % $Al_2O_3$;
   15.0-20.0 wt. % MgO;
   5-9.0 wt. % CaO;
   0-5.0 wt. % $Li_2O$;
   0-1.0 wt. % $Fe_2O_3$;
   0-1.0 wt. % $TiO_2$;
   0-5.0 wt. % $Na_2O$; and
   0-5.0 wt. % $B_2O_3$.

6. The glass fibers of claim 1, wherein the glass fibers have a Young's modulus greater than 82.7 GPa.

7. The glass fibers of claim 6, wherein the glass fibers have a Young's modulus greater than 89.6 GPa.

8. The glass fibers of claim 1, wherein the glass fibers have a density from 2.4 to 3.0 g/cc.

9. Biosoluble glass fibers formed from a composition comprising:
   40.0-54.0 wt. % $SiO_2$;
   31.0-50.0 wt. % $Al_2O_3$;
   15.0-30.0 wt. % MgO;
   0-14.0 wt. % CaO;
   0-5.0 wt. % $Na_2O$;
   0-1.0 wt. % $Fe_2O_3$;
   0-1.0 wt. % $TiO_2$;
   0-5.0 wt. % $Li_2O$; and
   0-9.0 wt. % $B_2O_3$,
   wherein the biosoluble glass fibers have a Young's modulus greater than 82.7 GPa.

10. The biosoluble glass fibers of claim 9, wherein the biosoluble glass fibers are suitable for reinforcing a composite.

11. The biosoluble glass fibers of claim 9, wherein the biosoluble glass fibers are formed by a mineral wool process.

12. The biosoluble glass fibers of claim 9, wherein the biosoluble glass fibers have a Young's modulus greater than 89.6 GPa.

13. The biosoluble glass fibers of claim 9, wherein the biosoluble glass fibers have a $k_{dis}$ greater than 200.0 ng/cm²/hour.

14. The biosoluble glass fibers of claim 13, wherein the biosoluble glass fibers have a $k_{dis}$ greater than 300.0 ng/cm²/hour.

15. A method of forming glass fibers, the method comprising:
   providing a glass batch comprising:
   40.0-54.0 wt. % $SiO_2$;
   31.0-50.0 wt. % $Al_2O_3$;

15.0-30.0 wt. % MgO;
0-14.0 wt. % CaO;
0-5.0 wt. % Na$_2$O;
0-1.0 wt. % Fe$_2$O$_3$;
0-1.0 wt. % TiO$_2$;
0-5.0 wt. % Li$_2$O; and
0-9.0 wt. % B$_2$O$_3$, and
fiberizing the glass batch using a mineral wool process to form the glass fibers,
wherein the glass fibers are biosoluble with a k$_{dis}$ greater than 100.0 ng/cm$^2$/hour.

16. The method of claim 15, wherein the glass fibers have a k$_{dis}$ greater than 200.0 ng/cm$^2$/hour.

17. The method of claim 15, wherein the glass fibers have a k$_{dis}$ greater than 300.0 ng/cm$^2$/hour.

18. The method of claim 15, wherein the glass fibers have a density from 2.4 to 3.0 g/cc.

19. The method of claim 15, wherein the glass fibers have a Young's modulus greater than 82.7 GPa.

* * * * *